United States Patent Office

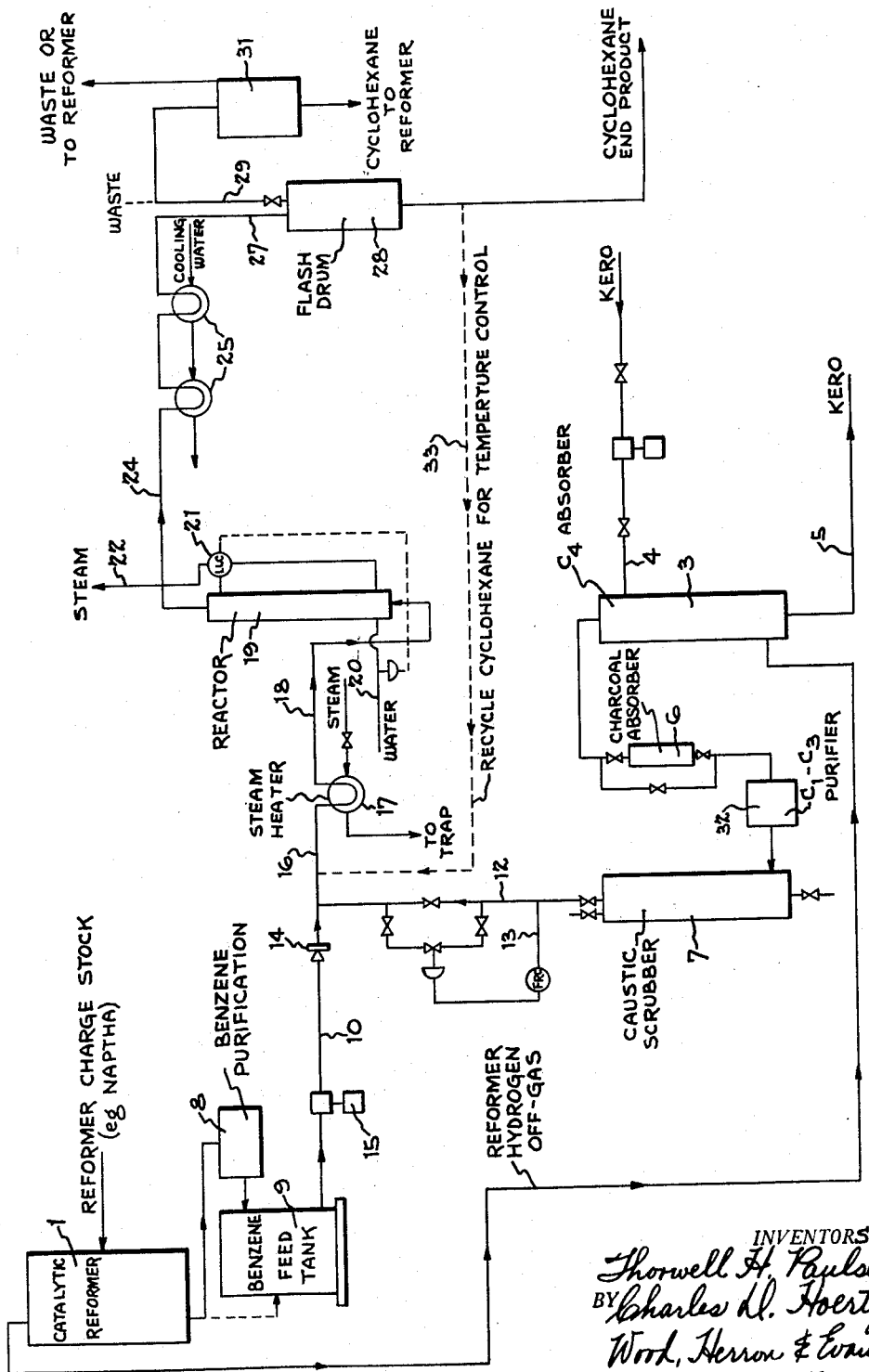

2,934,573
Patented Apr. 26, 1960

2,934,573

PREPARATION OF CYCLOHEXANE

Thorwell H. Paulsen and Charles D. Hoertz, Ashland, Ky., assignors to Ashland Oil & Refining Company, Ashland, Ky., a corporation of Kentucky Application February 6, 1957, Serial No. 638,552

5 Claims. (Cl. 260—667)

This invention relates to the production of cyclohexane by hydrogenation of benzene. The principal objective of the invention has been to provide a process for producing cyclohexane of high purity, such as is required in large quantities in the production of nylon and for other industrial purposes, in a manner which is more economical than other processes by which cyclohexane is now made, utilizing benzene and hydrogen gas which are readily available from oil refining operations.

As a chemical possibility, the preparation of cyclohexane by the hydrogenation of benzene has long been known. However, when hydrogen off-gas produced in large amounts in the catalytic reforming of petroleum hydrocarbons is employed, strenuous conditions, i.e., high pressure and high temperature, are required to initiate or sustain the reaction even though special catalysts are used, and the reaction once started is also highly exothermic. Because of such factors, secondary reactions occur which introduce undesirable impurities into the final product, even though benzene of high purity is used as the feed material. In nylon production, for example, cyclohexane having a purity of 99% or above and, in particular, a benzene content of not more than 0.1% by weight is requisite, for which reason yields of cyclohexane produced by the recombination of benzene with hydrogen produced in catalytic reforming are not acceptable unless subjected to further purifying operations at additional cost, and the economic advantages theoretically possible are not realized.

Various attempts have been made to conduct hydrogenation by using reformer gas under controlled conditions, such as by causing the reaction to occur progressively in a series of adiabatic reactors to each of which benzene is fed and the effluent of each of which is cooled before it enters the next. Similarly, efforts have been made to utilize special hydrogenation catalysts and to employ other controls, but such expedients have adversely affected the cost of operation. Thus, even though hydrogen and benzene have been available in large quantities at low cost, as concomitants of catalytic reforming operations in the petroleum industry, it has been said, "In the United States, developments of the past half decade have made it no longer economical to produce cyclohexane from benzene" (Peter W. Sherwood, consulting chemical engineer; "Petroleum Processing," p 74, May 1956).

This invention, paradoxically, is based upon the discovery that cyclohexane of high purity and low benzene content can be prepared in large quantity and at a cost which is favorably competitive with the cost of high purity cyclohexane prepared by other methods (such as the isomerization of methylcyclopentane) from benzene and hydrogen which are readily available from petroleum refining operations, in a simple and direct manner, provided the benzene is of suitable purity and provided particularly that the hydrogen used to contact the benzene does not contain an acidic sulfur content exceeding or substantially exceeding 10 parts per million.

Otherwise expressed, this invention is based upon the discovery that the removal of the sulfide content which catalytic reformer off-gas normally contains, to the extent that the hydrogen gas is substantially sulfur-free, permits hydrogenation of benzene to be initiated and conducted at temperatures significantly lower than those heretofore employed, whereby side reactions are eliminated and whereby cyclohexane having a purity of 99.5 mol percent and an unconverted benzene content of 0.05 mol percent can be produced in a single pass or once-through process.

At the refinery, reformer hydrogen off-gas suitable for use in the practice of the process readily may be prepared at low cost by simply passing the off-gas through a tower containing flake caustic soda or in other suitable manner known in the art to be suitable for the removal of $H_2S$, and also by removing contained $C_4$ and heavier hydrocarbon fractions, if present, by conventional absorption to prevent contamination of the final cyclohexane produced thereby. Inasmuch as the reaction of benzene and hydrogen is highly exothermic, it is also necessary, in accordance with this invention, to remove heat as the reaction proceeds, or otherwise the temperature will become elevated to the point where undesirable side reaction products such as methylcyclopentane will be formed. However, in accordance with this invention, temperature control is readily effected either in a single-stage or a recycle type of process respectively by absorbing heat indirectly through vaporization of a cooling liquid and controlling the pressure to control the rate of heat transfer or directly by auto-vaporization of partially liquid feed to the reactor.

In either process, the equipment is simple, the pressures and temperatures are low, preferably for example 250 p.s.i., 100° F. feed temperature, and any of the conventional hydrogenation catalysts may be employed, provided only that the catalyst is not so active that the reaction proceeds at a rate inconsistent with the rate at which heat conveniently may be removed. In substance, and contrary to the complexities which have led to characterization of the commercial hydrogenation of benzene as impractical, the present invention is based upon a process which follows theoretical possibilities realized by critical control of the acidic sulfur content of the hydrogen gas.

In past attempts to use catalytic reformer hydrogen gas for benzene hydrogenation, the suppression of catalyst activity required elevated temperatures to be maintained to cause reaction to proceed at all; for example, minimum feed temperature of the order of 350–500° F. was necessary. Within the present discovery that the removal of acidic sulfur from catalytic reformer hydrogen gas permits reaction to be initiated at much lower feed temperatures, a very important advantage of peak temperature reduction is obtained by reason of the fact that at the lower feed temperatures described herein at least a portion of the benzene feed is in the liquid state. Vaporization of the liquid feed as it reaches the site of reaction in the reactor extracts exothermic heat from the reaction zone and thereby reduces peak temperature in either the once-through or recycle type of process previously described. Thus, at the site of reaction temperatures not exceeding approximately 500° F. are easy to maintain by indirect cooling or by direct cooling through vaporization of liquid recycle cyclohexane. It will be understood that admission of benzene feed in the liquid state does not entirely eliminate the need for removal of exothermic heat from the reaction site by additional means, but it does substantially reduce the cooling load and minimizes the problem of heat control. This permits the hydrogenation to be conducted to completion in a single-stage or single-pass reactor of nominal size.

Catalytic reformer hydrogen gas, as obtained from a reformer hydrocarbon feed stock which has been thoroughly desulfurized before entering the reformer, has an approximate composition as follows:

| | Mol percent |
|---|---|
| $H_2$ | 85 |
| $C_1$ | 8 |
| $C_2$ | 4 |
| $C_3$ | 2 |
| $C_4$ and heavier | 1 |
| | 100 |

$H_2S$ _____ 150 p.p.m. (2 grains per 100 cu. ft.)

To utilize a gas of this type in the practice of the present invention, it is preferably first denuded of the $C_4$ and heavier hydrocarbon fractions, by absorption thereof in kerosene, for example, in the manner well understood by those who are skilled in the art. Were these hydrocarbons not removed, they would proceed through the reaction and appear in the final product either unmodified by the low reaction temperature or as the products of side reactions occurring even at the low reaction temperature. The hydrogen gas, following removal of these fractions but containing $C_3$ and lighter fractions, is then treated to remove acidic sulfur, hydrogen sulfide in particular, such that the final content is less than approximately 10 parts per million, calculated as acid sulfides. Catalytic reformer hydrogen will ordinarily contain a minimum acid sulfide content of approximately 150 parts per million, but through this difference the yield of high purity cyclohexane is achieved because the hydrogen will be accepted at low temperature and side reaction products will not be formed.

The acid sulfide-free hydrogen stream, in the simplest procedure, is mixed with benzene, heated to reaction temperature, and passed through a reactor containing catalyst in tubes which are surrounded by water or other volatilizable heat exchange medium. Exothermic heat of reaction elevates the temperature within the tubes but the heat is removed by vaporization of liquid feed and also by generating steam or pressure vapor at the outside of the tubes so that the rate of heat removal may be controlled by varying the pressure of the generated vapors. Temperatures may also be controlled in part by varying reactor inlet temperature.

In this procedure, effluent from the reactor, comprising cyclohexane and hydrogen plus unreacted hydrocarbons, may be passed to a flash drum to separate a liquid fraction of pure cyclohexane and hydrogen gas which contains an equilibrium concentration of cyclohexane. The latter may be absorbed for reconversion into benzene at the catalytic reformer. The flash drum liquid constitutes a finished product of high purity, although if necessary it may be stabilized by distillation to meet any commercial cyclohexane initial boiling point specification. In the latter instance, the stabilizer bottoms may be re-run if desired to remove any trace of higher molecular weight hydrocarbons.

The principal chemical reactions involved in the hydrogenation of benzene appear to be as follows:

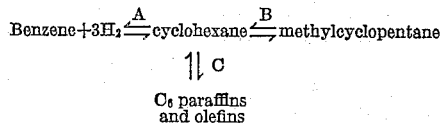

Inasmuch as reactions B and C are reactions desirably occurring in the catalytic reforming of petroleum hydrocarbons for maximum benzene production, and inasmuch as hydrogen off-gas is produced in the catalytic reforming process for obtaining higher octane motor fuels, the process of the present invention provides an abundant source of pure cyclohexane as an incident to the process of catalytically reforming petroleum hydrocarbons. Thus, the crude benzene produced in catalytic reforming may be purified at low cost through the removal of hydrocarbon contaminates in any suitable manner, such as Universal Oil Products Company's "Udex" process ("Petroleum Refiner," December 1955), of solvent extraction using a mixture of glycol and water. Through this means benzene having 99.9% purity and a solidifying point of approximately 5.5° C. may be produced. The reformer hydrogen off-gas may be treated for sulfur removal in the manner described, and the two streams then brought together for a single pass through a catalytic reactor of simple shell and tube design conventional in the petroleum industry.

As a variation of the once-through process, the hydrogen off-gas from the catalytic reformer, in addition to its treatment for sulfide removal, may be subjected to very low temperature to remove low molecular weight hydrocarbon impurities, then utilized for the hydrogenation of benzene, in which event the vapors off the cyclohexane flash drum may be recycled to eliminate the need of an absorber on this stream, thereby reducing the amount of hydrogen which must be subjected to purification.

In the practice of a variation of the process wherein the heat of the exothermic hydrogenation reaction is removed by vaporization in situ, a fixed bed reactor is employed and a portion of the liquid cyclohexane from the flash drum may be recycled to the infeed, not for the purpose of entering or being modified by the chemical reaction therein, but for the purpose of providing an internal refrigerant which, vaporizing at the reaction site, removes therefrom the correspondent heat of vaporization as it leaves the reactor. When hydrogen feed gas substantially free of both sulfides and hydrocarbons is employed in this process, the gas from the flash drum also may be recycled to the reactor.

In general, the rate at which the hydrogenation reaction proceeds increases with increase in temperature; but the equilibrium ratio at which cyclohexane is converted into methylcyclopentane increases logarithmically. For this reason, it is generally desirable to conduct the reaction at a temperature which is as low as possible consistent with production and purity requirements. In accordance with this invention, the utilization of hydrogen which is free from acidic sulfur permits the hydrogenation reaction to be initiated at temperatures as low as 90° F. With the feed at a low temperature of the order indicated and at peak reaction temperatures not exceeding approximately 500° F., the benzene is hydrogenated rapidly to completion whereby a final product of very low benzene content is produced; the conversion of cyclohexane into methylcyclopentane is so slow in comparison to the rate at which cyclohexane is formed and passes from the reactor that methylcyclopentane is virtually absent from the final product, as is unreacted benzene. For this reason, the formation of methylcyclopentane may be virtually eliminated; the content in the final product is well below commercial high purity cyclohexane specifications.

The activity of the catalyst used in the reaction has a bearing on reaction rate, and hence is related to the exothermic heat which must be removed to prevent undesirable temperature increase in the reaction zone. For example, rhodium catalyst, as commonly used in some chemical operations, has been found to be so active in sponsoring reaction that extra facilities are required to effect heat removal, although the catalyst is well suited to the process if this requirement is not objectionable. Catalysts which have been found particularly suitable are: platinum (Baker RD-150), platinum low acid activity (Houdry), palladium, and nickel (Girdler) or combinations supported in any suitable manner in the form of pellets or granules on alumina, silica, zirconia, diatomaceous earth, kieselguhr, or other carrier.

The single figure illustrates the practice of the process in a once-through system. It will be understood that a catalytic reformer will be operated conventionally at a pressure of 400–600 p.s.i. when used for the production of high octane motor fuel reformate or at a pressure of 200–300 p.s.i. when used alternatively for the production of benzene and other aromatics. Normally, the hydrogen off-gas from either type of operation is wasted and in either case contains acidic sulfur and $C_1$–$C_4$ or heavier hydrocarbons. When the reformer is operated for benzene production, crude benzene will be available at a temperature of approximately 100° F. and will contain non-aromatic compounds, higher molecular weight aromatic compounds, toluene, and xylenes. Benzene from sources other than a catalytic reformer may, of course, be used in the practice of the present invention, but the catalytic reforming process particularly is disclosed herein as a very low-cost source of hydrogen in addition to the benzene which the process also may be operated to produce.

The reformer hydrogen off-gas passes to an absorber 3 where $C_4$ and heavier hydrocarbon fractions are removed. This unit, typically, may comprise a tower filled with contact rings or bubble trays through which the hydrogen gas is passed in counter-current flow to kerosene or other suitable liquid absorbent supplied to the tower through line 4 and discharged through line 5. The absorber may be equipped with a liquid level controller for operation in the usual manner.

From the absorber 3 the hydrogen gas may be directed through a charcoal absorber 6 to remove any entrained kerosene, and is thence directed to a desulfurizer 7 which may comprise a tower filled with flake caustic soda whereby acidic sulfur is removed from the gas. The flow rate is adjusted in relation to tower size to provide for removal of sulfur from the gas to the degree that the effluent gas contains approximately 10 parts per million or less of sulfur, particularly hydrogen sulfide. The caustic soda scrubbing tower is disclosed because of its simplicity, but as the caustic soda is depleted it must be replaced. To avoid nuisances like this which are incidental to the operation of such a tower, other desulfurizing units may be used such as the Linde Air Products Company's molecular sieve or a circulating aqueous caustic solution followed by conventional gas drying tower.

For the production of high purity cyclohexane, the crude benzene from the reformer 1 is preferably purified as by means of Universal Oil Products Company's "Udex" solvent extraction, which is shown at 8 and which is sufficiently well known in the art that additional description of that operation is unnecessary. From this unit, purified benzene passes to a feed tank 9 from which it is pumped through line 10 into mixture with the desulfurized hydrogen gas coming through line 12, equipped with a flow rate controller 13. Line 10 contains a check valve 14, and the benzene may be delivered from the feed tank by means of a pump 15 with suitable flow control.

The benzene and hydrogen in admixture pass through the line 16 to a steam heater 17 which may be of the counterflow type, thence through line 18 to reactor 19. The heater is used to elevate the benzene-hydrogen mixture to feed temperature, of approximately 100° F. as previously noted.

Reactor 19, for the once-through process, comprises a steel shell having a plurality of vertical steel tubes therein communicating with manifolds at each end in the usual manner. Screening is installed over the lower ends of the tubes to support catalyst placed within the tubes. The reaction components enter the bottom of the reactor and pass through the tubes in contact with the catalyst, whereby the hydrogen and benzene are brought into chemical combination. Water or other vaporizable cooling liquid is delivered to the shell side of the reactor through line 20 and circulates around the tubes. Because of the exothermic heat of reaction, the water surrounding the tubes is vaporized, thereby absorbing heat from the reaction zone. For control of temperature within the tubes, the reactor shell is provided with a pressure and liquid level controller 21 through which the pressure within the shell may be regulated. Steam is liberated from the shell side of the reactor through line 22, hence the pressure within the shell determines the rate of vaporization, thereby determining the rate of heat transfer to limit reaction peak temperature.

The reactor effluent, passing through line 24, is cooled by means of one or a series of heat exchangers 25 supplied with cooling water to reduce effluent temperatrue to 100° F. or lower. The effluent then passes through line 27 to a flash drum 28 operated at a pressure of approximately 200 to 300 p.s.i.g. As will be noted from the ratios previously given, hydrogen gas in excess of the stoichiometric amount is maintained in the reactor. Reactor effluent, therefore, contains hydrogen gas, cyclohexane, and gases which are essentially at the temperature to which the stream has been subjected. In this respect it should be noted that the lower the operating pressure within the flash drum the more cyclohexane will be contained in the liberated hydrogen flash drum gas. The excess hydrogen gas (and inert gases) separates from the cyclohexane in the flash drum and either passes to waste through line 29 or may be passed to an absorber 31 to remove the contained cyclohexane. For example, this may be a packed tower or a bubble tower fed with benzene reformer feed as the liquid in which cyclohexane is absorbed; the liquid containing absorbed cyclohexane may be recycled from the absorber to the reformer.

The liquid fraction separating in the flash drum 28 comprises cyclohexane, which may then be stabilized if necessary.

If the hydrogen waste gas from the flash drum is recycled to the reactor 19, the $C_1$–$C_3$ and heavier hydrocarbons which are not removed at the absorber 3 will accumulate in the system and side reaction products therefrom are likely to be formed whereby the final product purity will be impaired. If conservation of hydrogen is desired, however, then, in addition to removing sulfur and $C_4$ hydrocarbons from the hydrogen off-gas stream at tower 7 and absorber 3, $C_1$–$C_4$ hydrocarbons also may be removed from the hydrogen gas by chilling the gas to very low temperature through compression cooling and expansion thereof as at chiller 32. In this event, the hydrogen liberated from the flash drum 28 may be recycled to the reactor 19, preferably after entrained cyclohexane has been removed.

The mol ratio of hydrogen to benzene in the feed to the reactor may be in the range of approximately 6:1 to 10:1 and weight hourly space velocity may be two pounds of feed per hour per pound of catalyst or less. The hydrogen may be compressed to 250 p.s.i. commingled with benzene, and preheated to a temperature of 90° F. by heater 17 to initiate reaction.

The temperature at the reactor inlet may be approximately 90–300° F., and the reactor temperature control is adjusted to prevent the peak temperature within the reactor from exceeding 500° F. except at the risk of impairing purity of the final product. At feed temperatures of above 300° F. the reaction temperature will be disproportionately higher because the feed will then be substantially all vapor and the cooling effect which is otherwise to be obtained by its vaporization within the reactor will be lost.

Instead of controlling internal reactor temperature by indirect cooling, a reactor having a fixed bed of catalyst may be employed and liquid cyclohexane drawn from the flash drum may be brought into admixture with the benzene and hydrogen feed prior to their admission to the reactor. Once the process is initiated, a temperature in the reactor will be achieved which is sufficiently high to vaporize the cyclohexane, whereby a cooling effect in the reactor is achieved by subtraction of the heat required for cyclohexane vaporization. The vapors pass through the reactor with the hydrogen and benzene as they are being combined, but without entering the chemical reaction. The rate at which cyclohexane is recycled permits peak temperature to be controlled.

This variation is illustrated diagrammatically by the dotted line 33 wherein a pump, suitable pressure control, and check valve are installed. In the fixed catalyst bed, a peak temperature of approximately 500° F. may be reached at a bed depth of approximately 30" when the weight hourly space velocity is 1.5, the hydrogen-benzene ratio is approximately 8.5:1, and the recycle to make-up ratio is approximately 70:30 by volume. This temperature at the prevailing speed of reaction is appreciably lower than the temperature at which methylcyclopentane normally is formed.

In the recycle type of process, a maximum weight hourly space velocity of 1.5 preferably is utilized and the pressure may be from 250–500 p.s.i.g. The hydrogen-benzene ratio in the recycle may be on a mol-to-mol basis of 7.5:1 to 10:1 and the ratio between recycled cyclohexane and fresh feed on a mol-to-mol basis may be 2:1 to 2.7:1. These are the preferred operating ranges to yield a high purity final product.

By the present invention, benzene, whether produced by catalytic reforming or derived from any other source, is hydrogenated to completion by the use of a gas containing hydrogen produced in the reformer, which gas otherwise normally is wasted by burning. Through desulfurization of such gas, high purity cyclohexane may be produced at a yield equalling the theoretical. For example, by using reformer off-gas in the manner described herein, approximately 121 barrels of cyclohexane is produced from each 100 barrels of benzene at a cost which is commercially competitive with the cost of producing cyclohexane through the isomerization of methylcyclopentane or by other methods.

Having described our invention, we claim:

1. In conjunction with the catalytic reforming of a petroleum hydrocarbon wherein an off-gas is formed consisting principally of hydrogen but also containing acidic sulfur compounds, the method which comprises removing sulfur compounds from the said hydrogen gas until the acidic sulfur content thereof does not exceed substantially 10 parts per million, then commingling substantially pure benzene in liquid state with the said hydrogen gas and heating the mixture to a temperature of approximately 90–100° F., passing the heated mixture, in a single pass into and out of contact with a hydrogenation catalyst whereby cyclohexane is formed and whereby exothermic heat is absorbed from the site of reaction through vaporization of the benzene from its liquid state, and absorbing additional heat from the site of reaction to maintain a peak temperature below approximately 500° F.

2. In conjunction with the catalytic reforming of a petroleum hydrocarbon wherein an off-gas is formed consisting principally of hydrogen but also containing acidic sulfur compounds, the method which comprises removing sulfur compounds from the said hydrogen gas by passing the same over flake caustic alkali until the acidic sulfur content thereof does not exceed substantially 10 parts per million, then commingling substantially pure benzene in liquid state with the said hydrogen gas and heating the mixture to a temperature of approximately 90–100° F., passing the heated mixture into and out of contact with a hydrogenation catalyst, in a single pass, whereby cyclohexane is formed and whereby exothermic heat is absorbed from the site of reaction through vaporization of the benzene from its liquid state, and absorbing additional heat from the site of reaction to maintain a peak temperature below approximately 500° F.

3. In the catalytic hydrogenation of a petroleum hydrocarbon wherein an off-gas is formed consisting principally of hydrogen but which contains acidic sulfur compounds, the method which comprises removing sulfur compounds from the said hydrogen gas until the acidic sulfur content thereof does not exceed substantially 10 parts per million, then continuously commingling a stream of substantially pure liquid benzene and liquid cyclohexane with a molar excess of said hydrogen gas over the amount required to effect hydrogenation of said benzene to cyclohexane and heating the mixture in the stream to a temperature of approximately 90–100° F., passing a stream of the heated mixture into and then out of contact with a hydrogenation catalyst, in a single pass, whereby cyclohexane continuously is formed from said stream and whereby sufficient exothermic heat continuously is absorbed from the site of reaction through vaporization of the liquid benzene and the said liquid cyclohexane from their liquid states to hold peak temperature below approximately 500° F., and separating the excess of hydrogen gas from the stream containing cyclohexane so produced.

4. In the catalytic hydrogenation of a petroleum hydrocarbon wherein an off-gas is formed consisting principally of hydrogen but which contains acidic sulfur compounds, the method which comprises removing sulfur compounds from the said hydrogen gas until the acidic sulfur content thereof does not exceed substantially 10 parts per million, then commingling the substantially pure liquid benzene with the said hydrogen gas and heating the mixture to a temperature of approximately 90–100° F. and at a pressure of approximately 200–300 pounds per square inch, passing the heated mixture into and out of contact with a hydrogenation catalyst, in a single pass, whereby cyclohexane is formed and whereby exothermic heat is absorbed from the site of reaction through vaporization of the benzene from its liquid state, and absorbing additional heat from the site of reaction to maintain a peak temperature below approximately 500° F.

5. In conjunction with the catalytic reforming of a petroleum hydrocarbon wherein an off-gas is formed consisting principally of hydrogen but also containing acidic sulfur compounds, the method which comprises removing sulfur compounds from the said hydrogen off-gas until the acidic sulfur content therefore does not exceed substantially 10 parts per million, whereby reaction of said gas with benzene may be initiated at a temperature of approximately 90–100° F., then bringing a molar excess of said gas into contact with substantially pure benzene, in a single pass, in the presence of a hydrogenation catalyst at a feed temperature of from approximately 90–300° F., thereby initiating catalytic reaction of said hydrogen gas with said benzene to produce cyclohexane, and continuously removing exothermic heat of reaction from the site of reaction such that the peak reaction temperature does not exceed substantially 500° F.

References Cited in the file of this patent

UNITED STATES PATENTS

| | | |
|---|---|---|
| 2,303,075 | Frey | Nov. 24, 1942 |
| 2,328,828 | Marschner | Sept. 7, 1943 |
| 2,515,279 | Van Der Hoeven | July 18, 1950 |
| 2,755,317 | Kassel | July 17, 1956 |
| 2,761,755 | Brown | Sept. 4, 1956 |